(12) United States Patent
Krueger

(10) Patent No.: US 7,379,424 B1
(45) Date of Patent: May 27, 2008

(54) SYSTEMS AND METHODS FOR ROUTING PACKETS IN MULTIPROCESSOR COMPUTER SYSTEMS

(75) Inventor: Paul Krueger, Minnetonka, MN (US)

(73) Assignee: Cray Inc., Seattle, WA (US)

( * ) Notice: Subject to any disclaimer, the term of this patent is extended or adjusted under 35 U.S.C. 154(b) by 942 days.

(21) Appl. No.: 10/643,575

(22) Filed: Aug. 18, 2003

(51) Int. Cl.
*H04L 12/28* (2006.01)
*G06F 15/163* (2006.01)

(52) U.S. Cl. .................... 370/236; 370/238; 370/252; 370/255; 370/352; 709/239

(58) Field of Classification Search ............... 370/230, 370/230.1, 231, 235–238, 252, 254, 255, 370/352, 356; 709/242, 238–239
See application file for complete search history.

(56) References Cited

U.S. PATENT DOCUMENTS

| | | | |
|---|---|---|---|
| RE28,577 E | 10/1975 | Schmidt ............... 179/15 BA |
| 4,330,858 A | 5/1982 | Choquet ................... 370/111 |
| 4,630,259 A | 12/1986 | Larson et al. ............... 370/60 |
| 4,771,391 A | 9/1988 | Blasbalg ................. 364/514 |
| 4,811,214 A | 3/1989 | Nosenchuck et al. ....... 364/200 |
| 4,868,818 A | 9/1989 | Madan et al. ................ 371/11 |
| 4,933,933 A | 6/1990 | Dally et al. ................ 370/60 |
| 4,980,822 A | 12/1990 | Brantley et al. ............ 364/200 |
| 5,008,882 A | 4/1991 | Peterson et al. |
| 5,031,211 A | 7/1991 | Nagai et al. .............. 379/221 |
| 5,036,459 A | 7/1991 | Den Haan et al. .......... 364/200 |
| 5,105,424 A | 4/1992 | Flaig et al. ............... 370/941 |
| 5,117,350 A | 5/1992 | Parrish et al. ............. 395/425 |
| 5,134,690 A | 7/1992 | Samatham ................ 395/200 |
| 5,157,692 A | 10/1992 | Horie et al. ................ 375/38 |
| 5,161,156 A | 11/1992 | Baum et al. ................. 371/7 |
| 5,170,482 A | 12/1992 | Shu et al. ................. 395/800 |
| 5,175,733 A | 12/1992 | Nugent ..................... 370/94 |
| 5,197,130 A | 3/1993 | Chen et al. ................ 395/325 |
| 5,201,044 A | 4/1993 | Frey, Jr. et al. ............ 395/575 |
| 5,210,705 A | 5/1993 | Chauvel et al. ............ 364/572 |
| 5,218,601 A | 6/1993 | Chujo et al. ................ 370/16 |
| 5,218,676 A | 6/1993 | Ben-ayed et al. .......... 395/200 |
| 5,239,545 A | 8/1993 | Buchholz ................. 370/95.3 |

(Continued)

FOREIGN PATENT DOCUMENTS

EP     0353819 A2     2/1990

(Continued)

*Primary Examiner*—Chi Pham
*Assistant Examiner*—Ahmed Elallam
(74) *Attorney, Agent, or Firm*—Schwegman, Lundberg & Woessner, P.A.

(57) ABSTRACT

A system and method of building a routing table for use in a multiprocessor computer system having a plurality of processing nodes and physical communication links interconnecting the processing nodes in a predefined topology. The system determines all single hops for each processing node, queries each adjacent node for its single hop routes, determines if all nodes can be reached and if all nodes cannot be reached, sets x=2. The system then queries each adjacent node for its "x" hop routes, eliminates all routes to a particular node that are longer than existing routes from the node where the routing table will reside to that particular node, eliminates all routes that introduce a cyclic dependency and chooses a best route for the node. The process is repeated as needed until all nodes can be reach all other nodes.

20 Claims, 4 Drawing Sheets

U.S. PATENT DOCUMENTS

| | | | |
|---|---|---|---|
| 5,276,899 A | 1/1994 | Neches | 395/800 |
| 5,583,990 A * | 12/1996 | Birrittella et al. | 712/29 |
| 5,682,479 A * | 10/1997 | Newhall et al. | 709/242 |
| 5,689,646 A * | 11/1997 | Thorson | 709/239 |
| 5,721,819 A * | 2/1998 | Galles et al. | 709/243 |
| 5,859,981 A * | 1/1999 | Levin et al. | 709/238 |
| 5,892,923 A * | 4/1999 | Yasuda et al. | 709/239 |
| 5,898,826 A * | 4/1999 | Pierce et al. | 714/4 |
| 5,970,232 A | 10/1999 | Passint et al. | 395/200.68 |
| 6,065,063 A * | 5/2000 | Abali | 709/242 |
| 6,094,686 A * | 7/2000 | Sharma | 709/240 |
| 6,101,181 A | 8/2000 | Passint et al. | 370/352 |
| 6,230,252 B1 * | 5/2001 | Passint et al. | 712/12 |
| 6,385,649 B1 * | 5/2002 | Draves et al. | 709/224 |
| 6,674,720 B1 * | 1/2004 | Passint et al. | 370/235 |
| 6,791,939 B1 * | 9/2004 | Steele et al. | 370/217 |
| 6,859,435 B1 * | 2/2005 | Lee et al. | 370/231 |
| 6,948,048 B2 * | 9/2005 | Baxter et al. | 712/18 |
| 7,096,251 B2 * | 8/2006 | Chiu et al. | 709/202 |
| 7,152,113 B2 * | 12/2006 | Reynders et al. | 709/238 |
| 7,200,117 B2 * | 4/2007 | Chiu et al. | 370/238 |
| 2001/0038634 A1 * | 11/2001 | Dally et al. | 370/412 |
| 2003/0043756 A1 * | 3/2003 | Reynders et al. | 370/254 |
| 2003/0140165 A1 * | 7/2003 | Chiu et al. | 709/238 |
| 2003/0142627 A1 * | 7/2003 | Chiu et al. | 370/238 |
| 2004/0257993 A1 * | 12/2004 | Lysne et al. | 370/230 |

FOREIGN PATENT DOCUMENTS

| | | |
|---|---|---|
| EP | 0473452 A2 | 3/1992 |
| EP | 0475282 A2 | 3/1992 |
| EP | 0479520 A2 | 4/1992 |
| EP | 0501524 A2 | 9/1992 |
| EP | 0570729 A2 | 11/1993 |
| WO | WO-87/01750 A1 | 3/1987 |
| WO | WO-88/08652 A1 | 11/1988 |
| WO | WO-95/16236 | 6/1995 |
| WO | WO-96/32681 A1 | 10/1996 |
| WO | WO-96/37834 A1 | 11/1996 |

* cited by examiner

SYSTEMS AND METHODS FOR ROUTING PACKETS IN MULTIPROCESSOR COMPUTER SYSTEMS

FIELD OF THE INVENTION

The present invention is relates generally to the field of high-speed digital data processing systems, and more particularly to systems and methods of routing packets in multiprocessor computer systems.

BACKGROUND INFORMATION

Multiprocessor computer systems consist of nodes interconnected by physical communication links in an n-dimensional topology. Messages between nodes are routed across the physical communication links in a variety of ways. In one approach, such as is described in U.S. Pat. No. 5,970,232, issued Oct. 19, 1999 to Passint et al., routers route messages between pairs of processing element nodes and a three dimensional network. A symmetric eight port router is described that, in one embodiment, has a port connected to each node; the remaining ports are connected to physical communication links in the +X, –X, +Y, –Y, +Z and –Z directions.

A primary consideration in the design of interconnect networks and corresponding routing algorithms is avoiding deadlock. Deadlock occurs when cyclic dependencies arise among a set of channel buffers, causing all involved buffers to fill up and block.

Approaches for avoiding deadlock are often dependent on a regular topology; failure of one or more communication links can reintroduce cyclic dependencies into what had been a deadlock-free routing scheme. What is needed is a system and method of routing that avoids cyclic dependencies in networks with irregular topologies, and in regular topologies made irregular due to failures on one or more components.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
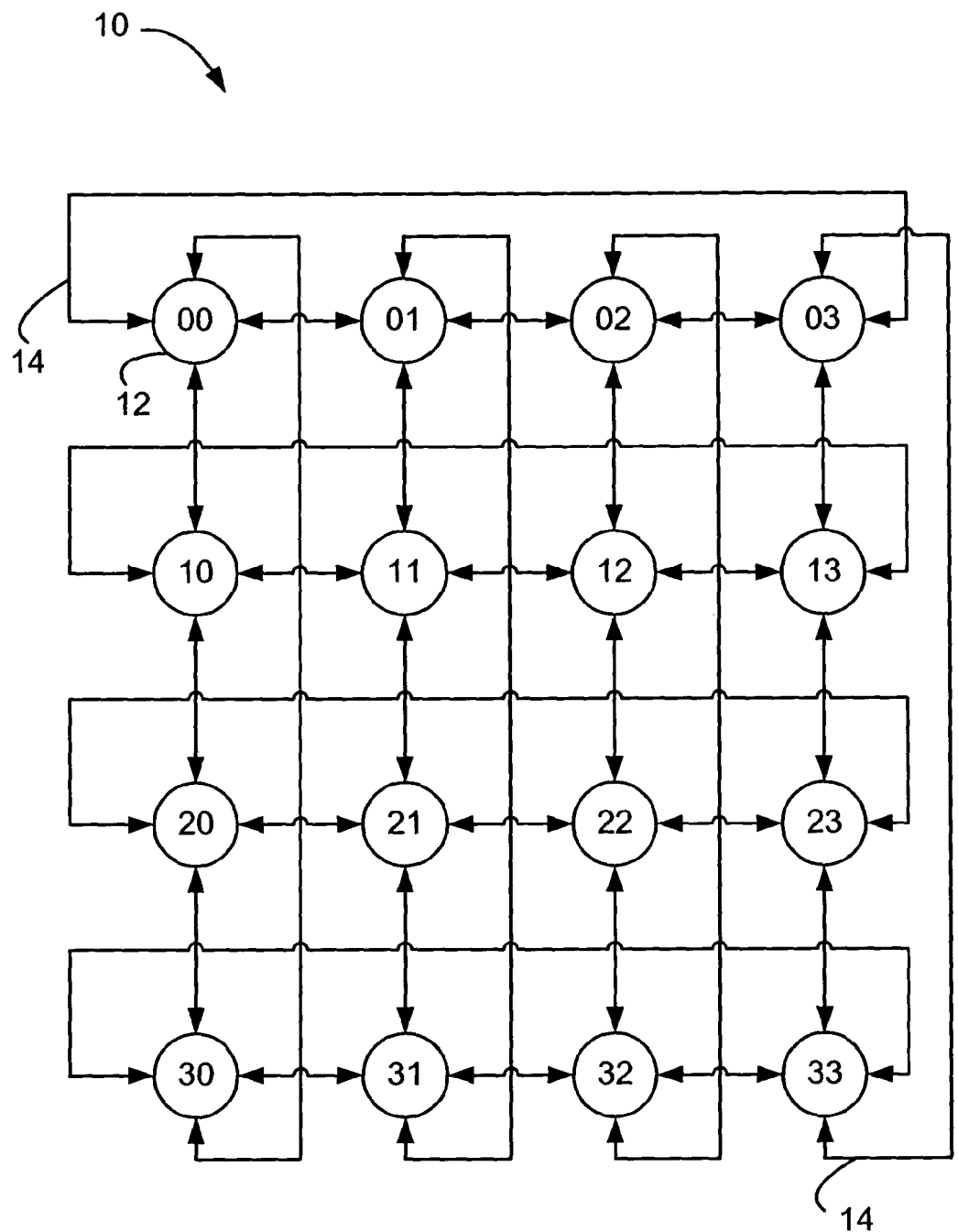
FIG. 1 illustrates a multiprocessor computer system according to the present invention.

A representative multiprocessor system 10 is shown in FIG. 1. In the example shown in FIG. 1, processing nodes 12 are connected to each other via communication links 14. In the embodiment shown, each node is connected directly to four other nodes. The present approach can be used on other topologies as well.

Figure 2:
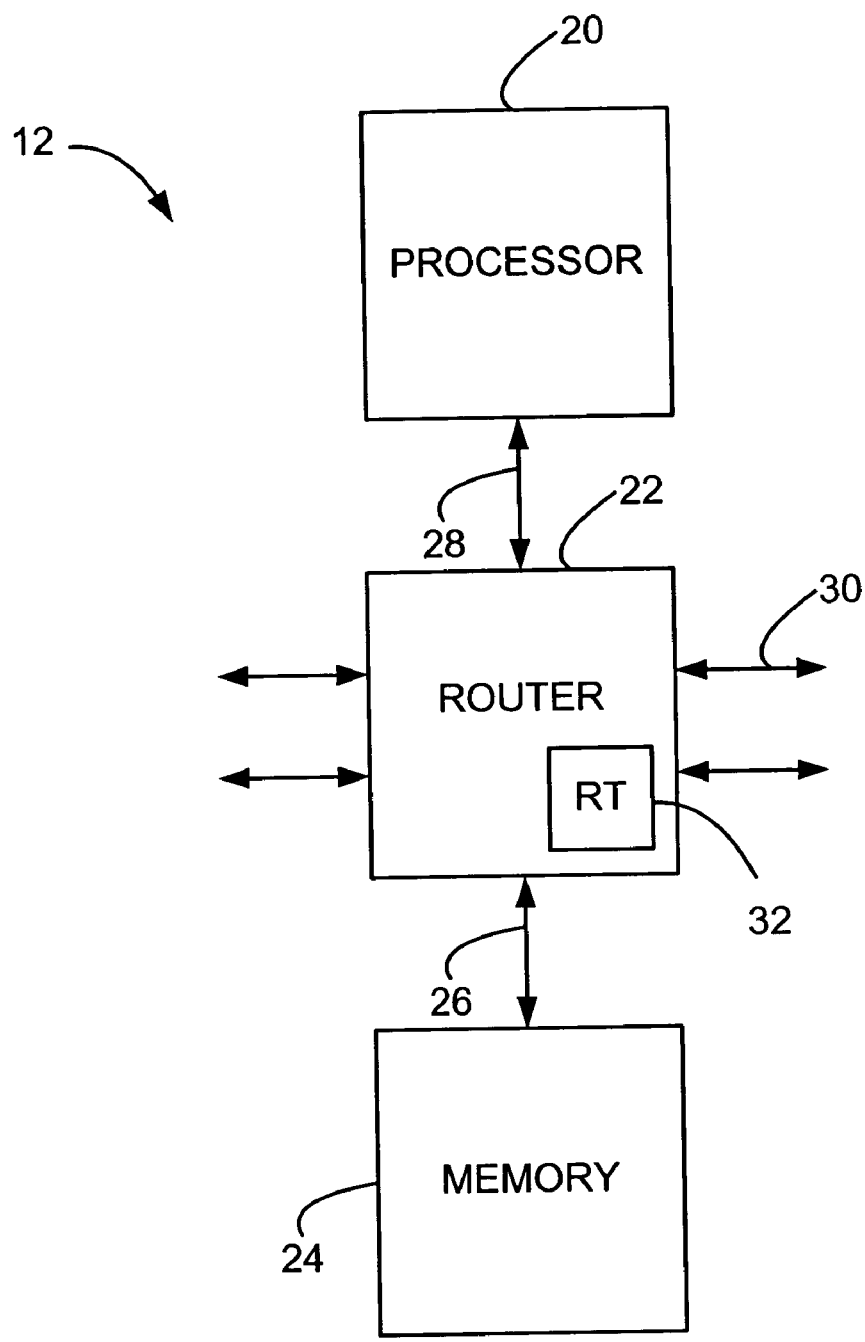
FIG. 2 illustrates a processing node which can be used in the multiprocessor computer system of FIG. 1.

A representative processing node 12 is shown in FIG. 2. In the example shown in FIG. 2, a processing node includes a processor 20, a router 22 and memory 24. Router 22 includes a memory port 26, a processor port 28, four router ports 30 and a routing table 32. Router ports 30 connected to other nodes 12 over links 14.

In one embodiment, all routing across links 14 is controlled by software-loaded, distributed routing tables. This allows flexibility in the topology and network configuration. In one embodiment, routing table 32 in router 22 specifies the router port 30 to take based upon the destination node number and address. In one such embodiment, a separate routing table 32 is associated with each router port 30.

In one such embodiment, system 10 provides global addressing of local memories 24. High-order address bits specify the node 12 that is the destination of the message.

In one embodiment, routing tables 32 are consulted in parallel with arbitration, and actually specify the router ports 30 of the next router 22, so that the desired outputs can be known as soon as a packet enters the next router 22. In addition, each router 22 includes a buffer pool at each input for each virtual channel. In one embodiment, a separate virtual channel is provided for request and response packets. All packets are eligible to arbitrate for output ports (packets are not blocked behind packets ahead of them on the same virtual channel). Router 22 implements a wave-based arbitration mechanism that allows the highest-priority packet in arbitration to choose its output first, and then assigns priority for each port 30 in a round-robin manner.

In one embodiment, packet priority is selectable by software, such that certain classes of packets (e.g., I/O) can be given higher priority. The network also automatically ages packets in the network, increasing their priority the longer they stay in the network. This reduces the incidence of extremely long wait times that can otherwise result from multiple stages of contention within the network.

Each routing table 32 is created incrementally. Smaller routes are developed and then used to build larger routes. The algorithm applies a form of greedy algorithm to converge quickly to a functionally correct, but perhaps suboptimal result. One example of building a routing table according to the present invention is described in FIG. 3.

Figure 3:
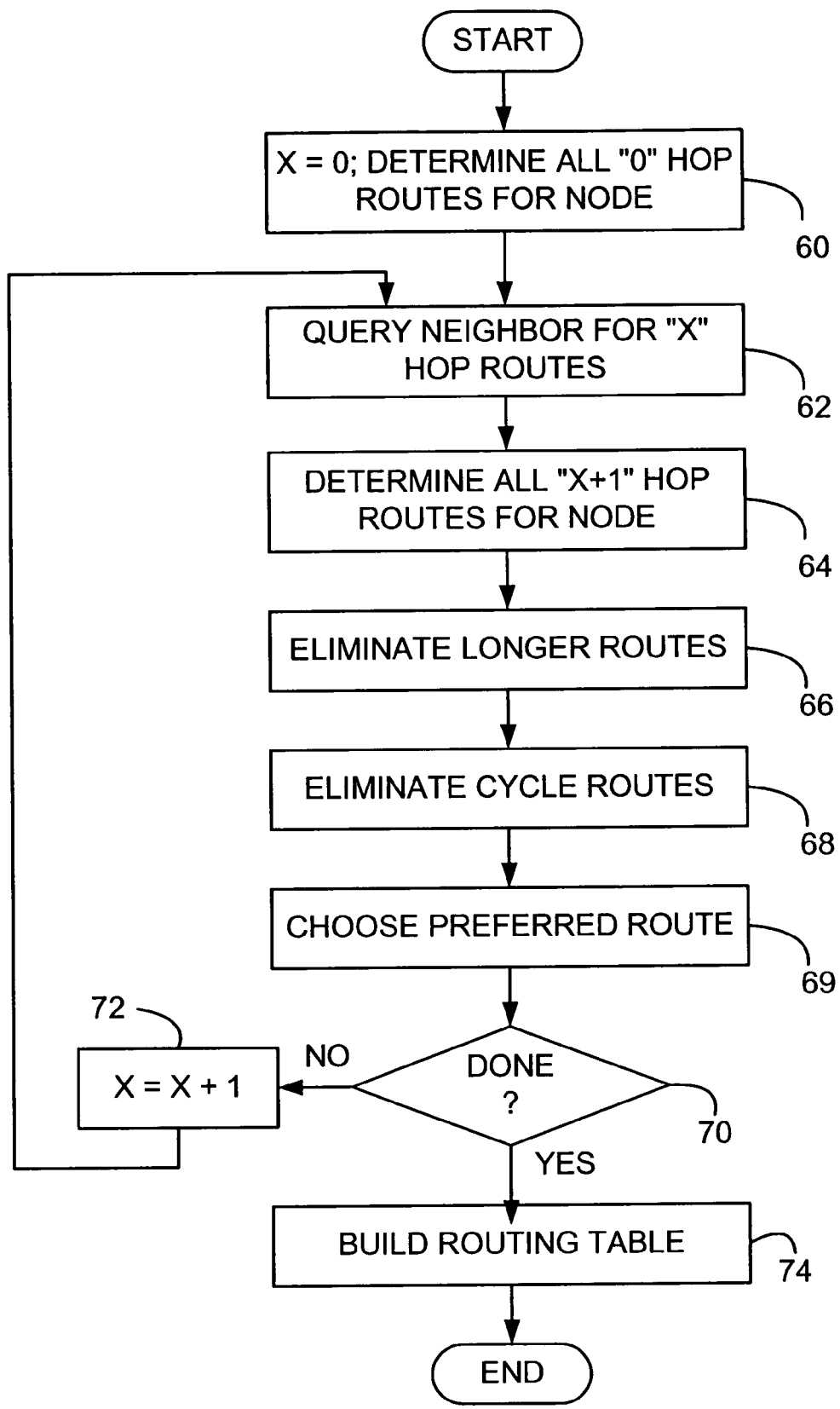
FIG. 3 illustrates a method of building a routing table according to the present invention.

In the embodiment shown in FIG. 3, the node initializes at 60 and each node 12 determines its "0" routes (i.e., the routes to itself). Control then moves to 62, where each node 12 queries its neighboring nodes 12 for their "0" hops. These are used by each node to determine all "1" hops from that node. A check is made at 66 if there is more than one path to any node. If so, all routes that are longer than the route of the shortest route (or routes) are discarded. A check is made at 68 to determine if any of the new routes introduce a cycle. If so, the route is discarded.

Control then moves to 69, where the node selects among all the routes of length i that haven't been eliminated by the previous steps. Those preferred choices become the routes that are given to its neighbors in step 62 of the next iteration (route length of X+1).

In one embodiment, each node 12 reviews the list of routes at 69. If the list of routes has more than one route to any particular node, the node applies a routing algorithm to pick the route used in routing to that node. In one embodiment, a greedy algorithm is used to select the route based on a routing protocol such as dimension order routing. In another embodiment, each node looks at the number of times a particular link 14 is traversed by its routes, and attempts to spread the load across all the possible links 14.

Control then moves to 70. At 70, each node 12 determines if all other nodes can be reached by a route. If so, control moves to 72. If not, control moves to 70 and increments variable X.

Control them moves to 62, where each node 12 queries its neighboring nodes 12 for their "X" hops. These are used by each node 12 to determine all "X+1" hops from that node. A check is made at 66 if there is more than one path to any node. If so, all routes that are longer than the route of the shortest route (or routes) are discarded.

A check is made at 68 to determine if any of the new routes introduce a cycle. If so, the route is discarded. At 70, each node 12 determines if all other nodes can be reached by a route. If so, control moves to 74. If not, control moves to 72 and increments variable i.

At 74, each node builds its routing table.

Deadlock can also arise due to dependencies between request and response packets. Cycles are introduced between request and response packets if they use dependent resources. One mechanism used to avoid dependency cycles is the use of alternative virtual channels.

In one embodiment, system 10 includes two virtual channels for each communication link 14. In one such embodiment, the hardware provides for requests and responses to use different virtual channels.

In addition, the routing tables can be used to select from two virtual channels for each request or response. Each possible virtual channel selection becomes just another route choice for the algorithm. Other routing schemes make explicit choices about the use of virtual channels (for example the use of explicitly pre-selected "datelines"). In this algorithm no special manipulation of virtual channels is required. Instead, the use of alternative virtual channels to avoid cycles becomes an emergent property of the algorithm. In a normally configured network the result may be identical to that of schemes that use explicit datelines. In an irregular topology, such as those that arise as the result of faults in hardware, they may be used differently. In all cases, the algorithm assures routes that are free of dependency cycles.

Deadlock situations can be shown via a channel dependency graph, a directed graph whose nodes represent network channels and whose arcs represent dependencies between channels. An arc exists between channels x and y if and only if a packet will be routed directly from channel x to channel y as part of some selected route between two nodes. It can be proven that a network is deadlock free if its channel dependency graph is acyclic.

To avoid deadlock due to cyclic dependency, in one embodiment a dateline is defined. Any packet that crosses that dateline changes from one virtual channel to another. That breaks the dependency cycle.

Such an approach works well for regular topologies but not as well for irregular topologies. In one embodiment, therefore, each node 12 combats cyclic dependency by maintaining a bit vector for each virtual channel. They are used as part of 68 to eliminate cycle routes.

A bit-vector is kept for each hop (call it "A") (a hop is defined as the use of a specific virtual channel over a specific physical link). Each bit in the bit vector represents some other hop in the system. A bit corresponding to hop "B" is set in the bit-vector for hop "A" if and only if the inclusion of a dependency from hop A to hop B would result in a cycle in the dependency graph. The specific data structures and algorithm used to support this are discussed below. The result is that any dependency cycle that would be introduced as the result of adding any route can be checked by looking at a single bit.

Since the routing algorithm always builds longer routes from shorter routes, it is sufficient to check only the single dependency that arises from the first two hops of any given route. All subsequent dependencies that arise because of routes of length i would have been checked when shorter sub-routes were selected in previous stages of the algorithm. When a route is selected, all relevant bit-vectors are updated for use in subsequent stages of the routing algorithm.

In one such embodiment, each hop is described in terms of the source and destination output port 30 and the virtual channel being used. Each instance of a hop must have a unique reference. That is, if it is necessary to refer to the same <port port vc> combination in multiple places, those reference must be to the same physical structure. This can be done in code by providing a function that either locates an existing hop structure with specified ports and virtual channel or else creates such a structure if it doesn't already exist.

One way to implement such a function is to keep a global array of hops and search it as needed. It should be sized to be large enough to handle as many unique hops as are possible within the network being routed. For example, if there are four inter-router links leaving each router 22, with two possible virtual channels defined for each port 30, the number of possible hops is 8*the number of routers 30.

In one approach, one could use the index of the hop's entry in the array as a hop identifier and have a field in the hop itself that contains this value. One could also keep a value in the system that points to the next unallocated entry in the array and update this as new hops are created.

At the beginning of the routing algorithm, the global hop-array is cleared. Each hop object includes an index and four bit-vectors (boolean arrays) that represent parts of the dependency graph and are used as part of the cycle checking. In the description below, the four bit-vectors will be referred to as: cycle-to-hops, cycle-from-hops, pred-hops and succ-hops. These are sized identically to the global hop array with one bit for each possible hop. The dependency graph is consequently kept in a distributed fashion among all the hops.

When a dependency is added between, for example, hopA and hopB, the bit corresponding to hopB is set in the succ-hops array of hopA and the bit corresponding to hopA is set in the pred-hops array of hopB. Other updates are required as shown below. (The following example assumes the presence of functions to do an "inclusive or" of two arrays (bit-ior that takes two arrays as arguments and leaves the result in the first array) and to set individual bits (sbit that takes an array and an index to set and a bit value)).

A pseudo code representation of the actions to be taken when a dependency is added (i.e. we have accepted a new route and add the dependency between the first two hops in the route) follows.

1) Update hops that would result in a cycle when going from hopB:
   bit-ior (hopB→cycle-from-hops, hopA→cycle-from-hops)
   bit-ior (hopB→cycle-from-hops, hopA→pred-hops)

2) Update hops that would result in a cycle when going to hopA:
   bit-ior (hopA→cycle-to-hops, hopB→cycle-to-hops)
   bit-ior (hopA→cycle-to-hops, hopB→succ-hops)

3) Update pred-hops for hopB:

```
sbit (hopB→pred-hops, hopA→index, 1)
```
4) Update succ-hops for hopA
```
sbit (hopA→succ-hops, hopB→index, 1)
```
5) Update hops that would result in a cycle when going from some other hop to hopA. (Assume hops is the global system array of hops. You need to iterate over a set of hop indices. You can do this using a function that converts a bit array to a list of corresponding numbers (i.e. if bit X is set then the value X appears in the output list).)
```
it_list=bit-vector-to-numbers (hopA→cycle-to-hops)
for (i=it_list.first, i!=null, i=it_list.next)
sbit (hops[i]→cycle-from-hops, hopA→index, 1)
bit-ior (hops[i]→cycle-from-hops, hopA→pred-hops)
bit-ior (hops[i]→cycle-from-hops, hopA→cycle-from-hops)
```

6) Update hops that would result in a cycle when going from some other hop to hop B:
```
it_list=bit-vector-to-numbers (hopB→cycle-from-hops)
for (i=it_list.first, i!=null, i=it_list.next)
sbit (hops[i]→cycle-to-hops, hopB→index 1)
bit-ior (hops[i]→cycle-to-hops, hopB→succ-hops)
bit-ior (hops[i]→cycle-to-hops, hopB→cycle-to-hops)
```
While routing, to check for a cycle if the dependency hopA=>hopB were to be added to the graph, use the following check:
```
if (hopA→cycle-from-hops [hopB→index]=1) . . .
```
If the condition is met, then a cycle would exist if that dependency was added and the route will be rejected. By making the incremental algorithm that constructs the routing table aware of virtual channels and by allowing each node 12 to choose between virtual channels, the algorithm in effect defines its own date line equivalents wherever it needs them. They arise naturally as an emergent property of the algorithm rather than having been explicitly defined. When there is only one available route, it is taken. When, however, there are many possible routes, node 12 applies a greedy algorithm to choose between the routes.

The general notion of a greedy algorithm is that, given a series of decisions to make, they should be made as quickly and optimally as possible. This may result in choices that are not globally optimal. However, in most cases using reasonable decision heuristics results in choices that are close to or exactly globally optimal. The idea behind greedy is that each decision is the best one that can immediately be made using currently available information. Choices are never re-considered or changed. Greedy algorithms, therefore, tend to be very quick to make decisions. Non-optimality can be mitigated to some extent by providing very good guidelines for making the needed decisions.

For example, one of the standard ways of routing is dimension order route. This choice criterion can be used within this invention to select from among alternative routes that one which most closely follows a specified dimension order. If applying this to a regular, fault-free topology, the described algorithm of the present invention will always choose to move in a designated dimension first, and then in a second dimension. The set of selected routes will consequently be globally optimal.

When, however, there are faults (e.g. a missing link between two nodes) or the dimension ordered routing is not possible for some other reason, the routing algorithm of the present invention is able to adapt to those faults, deviate from strict dimension ordering, and find an alternative route while guaranteeing that there are no cyclical dependencies.

Figure 4:
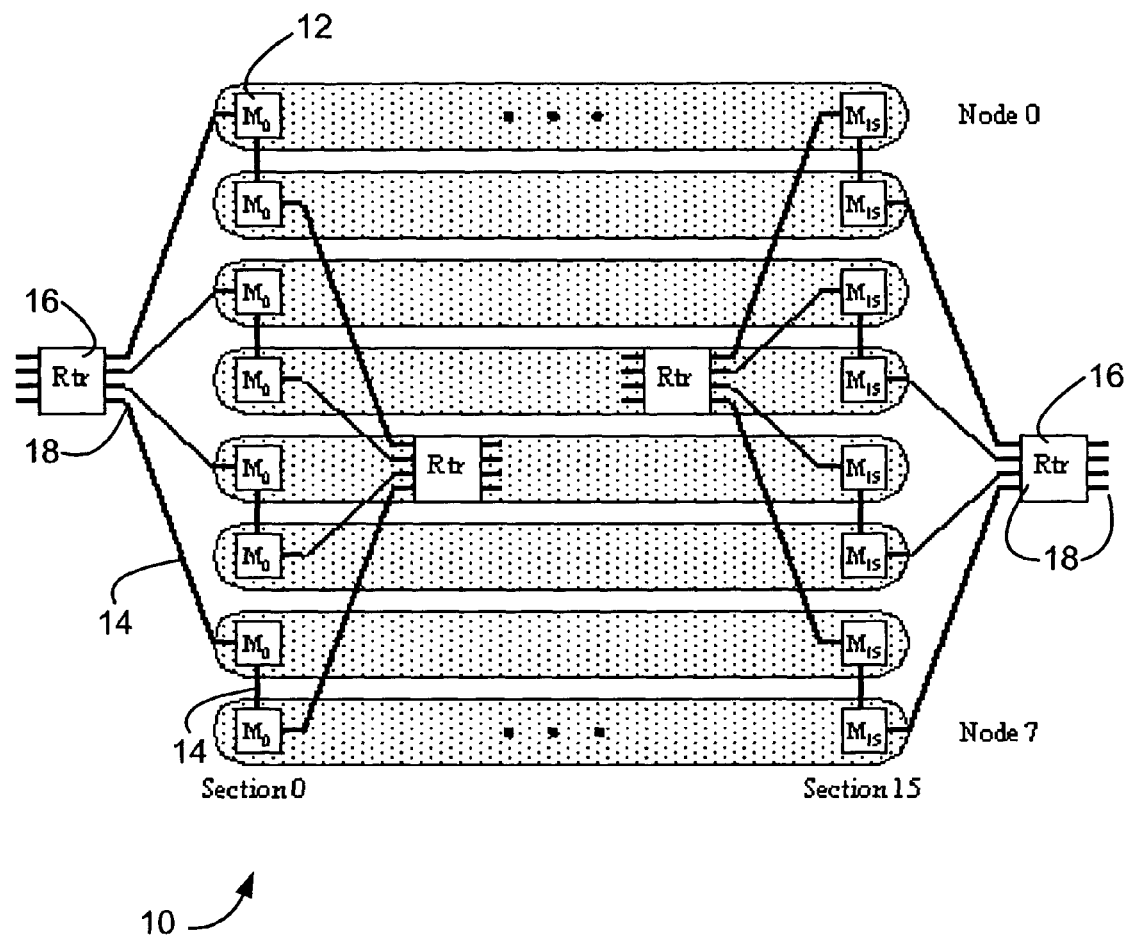
FIG. 4 shows another example of a multiprocessor computer system according to the present invention.

Another example of a multiprocessor system 10 is shown in FIG. 4. In the example shown in FIG. 4, a router 30 in each processing node 12 is connected to a router 16 and to a router 30 in another node 12. Each router 16 includes eight router ports 18. Four ports 18 are connected to processing nodes 12; the remaining ports 18 are connected to other routers. In one embodiment, processing node 12 is configured as shown in FIG. 2.

As in the example discussed above, in one embodiment of system 10 in FIG. 4, all routing across links 14 is controlled by software-loaded, distributed routing tables. A router table is stored in memory of each router 16 and each router 30. This allows flexibility in the topology and network configuration. In one embodiment, each routing table in router 16 specifies the router port 18 to take based upon the destination node number and address.

The method of incrementally building a routing table applies to the configuration shown in FIG. 4 as well. Once again, routing tables are built incrementally by querying neighbors as in FIG. 3. Now, however, router 16 becomes a neighbor in the process. The method of identifying cyclic dependencies applies as well.

Now, however, hops will be used for router to node connections as well. That will increase the size of the array that is needed.

Another example of a multiprocessor system 10 is shown in FIG. 4. In the example shown in FIG. 4, a router 30 in each processing node 12 is connected to a router 16 and to a router 30 in another node 12. Each router 16 includes eight router ports 18. Four ports 18 are connected to processing nodes 12; the remaining ports 18 are connected to other routers. In one embodiment, processing node 12 is configured as shown in FIG. 2.

As in the example discussed above, in one embodiment of system 10 in FIG. 4, all routing across links 14 is controlled by software-loaded, distributed routing tables. A router table is stored in memory of each router 16 and each router 30. This allows flexibility in the topology and network configuration. In one embodiment, each routing table in router 16 specifies the router port 18 to take based upon the destination node number and address.

The method of incrementally building a routing table applies to the configuration shown in FIG. 4 as well. Once again, routing tables are built incrementally by querying neighbors as in FIG. 3. Now, however, router 16 becomes a neighbor in the process. The method of identifying cyclic dependencies applies as well. Now, however, hops will be used for router to node connections as well. That will increase the size of the array you need.

DEFINITIONS

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system=s registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. In a multiprocessor computer system having a plurality of processing nodes and physical communication links interconnecting the processing nodes in a predefined topology, wherein each processing node includes a processor, a router and a local memory, wherein the physical communication links connect a router in one processing node to a router in another processing node, and wherein each router consults a routing table resident within its associated processing node when deciding where to route a message from one processing node to an adjacent processing node, a method of building a routing table, comprising:
   a) determining all single hops for each processing node;
   b) querying each adjacent node for its single hop routes;
   c) determining if all nodes can be reached;
   d) if all nodes cannot be reached, setting x=2;
   e) querying each adjacent node for its "x" hop routes;
   f) eliminating all routes to a particular node that are longer than existing routes from the node where the routing table will reside to that particular node;
   g) eliminating all routes that introduce a cyclic dependency;
   h) choosing a preferred route to the particular node among the routes that have not been eliminated by either f or g;
   i) determining if all nodes can now be reached;
   j) if all nodes cannot be reached, setting x=x+1 and repeating e through j; and
   k) if all nodes can be reached, building the routing table.

2. The method of claim 1, wherein querying each adjacent node for its "x" hop routes includes obtaining dependency information for each route.

3. The method of claim 2, wherein the dependency information is stored as a bit vector.

4. The method of claim 1, wherein choosing a preferred route to the particular node includes comparing routes to the particular node to a route obtained by applying a routing algorithm and selecting the route that is closest to the route obtained by applying the routing algorithm.

5. The method of claim 1, wherein querying each adjacent node includes reading hop routes from the local memory of the adjacent node.

6. A multiprocessor computer system comprising:
   a plurality of processing element nodes, each processing element node having a processor, a router and a local memory; and
   physical communication links interconnecting the processing element nodes in a predefined topology, wherein the physical communication links connect a router in one processing element node to a router in another processing element node;
   wherein each router includes:
      a plurality of ports, wherein the ports receive and send messages;
      a routing table associated with each port, wherein the routing table includes entries having directions for routing a message along a given route; and
      a route processor, wherein the route processor determines the directions for routing by:
         a) determining all single hops for each processing node;
         b) querying each adjacent node for its single hop routes;
         c) determining if all nodes can be reached;
         d) if all nodes cannot be reached, setting x=2;
         e) querying each adjacent node for its "x" hop routes;
         f) eliminating all routes to a particular node that are longer than existing routes from the node where the routing table will reside to that particular node;
         g) eliminating all routes that introduce a cyclic dependency;
         h) choosing a preferred route to the particular node among the routes that have not been eliminated by either f or g;
         i) determining if all nodes can now be reached;
         j) if all nodes cannot be reached, setting x=x+1 and repeating e through j; and
         k) if all nodes can be reached, building the routing table.

7. The system of claim 6, wherein querying each adjacent node for its "x" hop routes includes obtaining dependency information for each route.

8. The system of claim 7, wherein the dependency information is stored as a bit vector.

9. The system of claim 6, wherein choosing a preferred route to the particular node includes comparing routes to the particular node to a route obtained by applying a routing algorithm and selecting the route that is closest to the route obtained by applying the routing algorithm.

10. The system of claim 6, wherein each router is capable of accessing the local memory on adjacent nodes.

11. A device, comprising:
   a plurality of ports including a first port and a second port, wherein the ports receive and send messages;
   a routing table associated with each port, wherein the routing table includes entries having directions for routing a message along a given route; and
   a route processor, wherein the route processor determines the directions for routing by:
      a) determining all single hops for each of a plurality of processing nodes including a first node and a second node;
      b) querying each adjacent node for its single hop routes;

c) determining if all nodes can be reached;
d) if all nodes cannot be reached, setting x=2;
e) querying each adjacent node for its "x" hop routes;
f) eliminating all routes to a particular node that are longer than existing routes from the node where the first routing table will reside to that particular node;
g) eliminating all routes that introduce a cyclic dependency;
h) choosing a preferred route to the particular node among the routes that have not been eliminated by either f or g;
i) determining if all nodes can now be reached;
j) if all nodes cannot be reached, setting x=x+1 and repeating e through j; and
k) if all nodes can be reached, building the first routing table.

12. The device of claim 11, wherein querying each adjacent node for its "x" hop routes includes obtaining dependency information for each route.

13. The device of claim 12, wherein the dependency information is stored as a bit vector.

14. The device of claim 11, wherein choosing a preferred route to the particular node includes comparing routes to the particular node to a route obtained by applying a routing algorithm and selecting the route that is closest to the route obtained by applying the routing algorithm.

15. The device of claim 11, wherein the routing table includes a different port routing table for each of the plurality of ports.

16. In a computer having a plurality of ports and a routing table associated with each port, wherein the routing table includes entries having directions for routing a message along a given route, a computer-readable medium including instructions that, when executed by a computer, cause the computer to determine the directions for routing by:

a) determining all single hops from the computer to its adjacent processing nodes;
b) querying each adjacent processing node for its single hop routes;
c) determining if all nodes can be reached;
d) if all nodes cannot be reached, setting x=2;
e) querying each adjacent processing node for its "x" hop routes;
f) eliminating all routes to a particular node that are longer than existing routes from the node where the first routing table will reside to that particular node;
g) eliminating all routes that introduce a cyclic dependency;
h) choosing a preferred route to the particular node among the routes that have not been eliminated by either f or g;
i) determining if all nodes can now be reached;
j) if all nodes cannot be reached, setting x=x+1 and repeating e through j; and
k) if all nodes can be reached, building the routing table.

17. The medium of claim 16, wherein querying each adjacent node for its "x" hop routes includes obtaining dependency information for each route.

18. The medium of claim 17, wherein the dependency information is stored as a bit vector.

19. The medium of claim 16, wherein choosing a preferred route to the particular node includes comparing routes to the particular node to a route obtained by applying a routing algorithm and selecting the route that is closest to the route obtained by applying the routing algorithm.

20. The medium of claim 16, wherein the routing table includes a different port routing table for each of the plurality of ports.

* * * * *

UNITED STATES PATENT AND TRADEMARK OFFICE
CERTIFICATE OF CORRECTION

| | | |
|---|---|---|
| PATENT NO. | : 7,379,424 B1 | Page 1 of 1 |
| APPLICATION NO. | : 10/643575 | |
| DATED | : May 27, 2008 | |
| INVENTOR(S) | : Krueger | |

It is certified that error appears in the above-identified patent and that said Letters Patent is hereby corrected as shown below:

On the title page, item (56), under "U.S. Patent Documents", in column 1, line 9, after "Peterson et al." insert -- 370/406 --.

On the title page, item (57), under "Abstract", in column 2, line 14, after "can" delete "be".

In column 4, line 27, delete "8*the" and insert -- 8 * the --, therefor.

Signed and Sealed this

Seventh Day of October, 2008

JON W. DUDAS
*Director of the United States Patent and Trademark Office*